United States Patent
Rohrbach et al.

[11] Patent Number: 6,004,381
[45] Date of Patent: Dec. 21, 1999

[54] FILTRATION DEVICE AND METHOD USING ABSORPTION FOR THE REMOVAL OF GAS PHASE CONTAMINANTS

[75] Inventors: Ronald P. Rohrbach, Flemington; Peter D. Unger, Convent Station, both of N.J.; Richard M. Sturgeon, Maumee, Ohio; Gordon W. Jones, Toledo, Ohio; Bijan Kheradi, Perrysburg, Ohio

[73] Assignee: AlliedSignal Inc., Morristown, N.J.

[21] Appl. No.: 08/958,719

[22] Filed: Oct. 23, 1997

Related U.S. Application Data

[62] Division of application No. 08/736,308, Oct. 24, 1996, Pat. No. 5,713,971, which is a continuation of application No. 08/363,500, Dec. 23, 1994, abandoned.

[51] Int. Cl.[6] ................................................. B01D 47/14
[52] U.S. Cl. ................................ 95/211; 96/296; 261/104
[58] Field of Search ..................................... 261/104, 107, 261/DIG. 17, DIG. 65; 95/170, 171, 159, 210–212; 96/130, 298, 361, 181, 99, 296; 55/528, 302, 303; 428/397, 398, 362, 372, 365

[56] References Cited

U.S. PATENT DOCUMENTS

| | | | |
|---|---|---|---|
| 1,273,682 | 7/1918 | Slater et al. | 261/104 |
| 2,085,390 | 6/1937 | Quinlivan | 261/104 |
| 2,603,468 | 7/1952 | Sutton | 261/104 |
| 2,653,017 | 9/1953 | Frost | 261/104 X |
| 3,505,175 | 4/1970 | Zalles | 261/80 X |
| 3,754,377 | 8/1973 | Clonts | 95/211 |
| 3,888,955 | 6/1975 | Maruko | 261/104 X |
| 3,991,724 | 11/1976 | Geiser | 261/99 X |
| 4,031,180 | 6/1977 | Bohanon | 261/106 |
| 4,086,305 | 4/1978 | Dobritz | 261/104 X |
| 4,098,852 | 7/1978 | Christen et al. | 261/104 |
| 4,102,656 | 7/1978 | Koritz | 261/107 X |
| 4,130,487 | 12/1978 | Hunter et al. | 55/521 X |
| 4,166,087 | 8/1979 | Cline et al. | 261/DIG. 17 |
| 4,300,925 | 11/1981 | Nikandrov et al. | 96/130 |
| 4,323,373 | 4/1982 | Fritz | 95/281 |
| 4,578,091 | 3/1986 | Borja | 95/214 |
| 4,774,032 | 9/1988 | Coates et al. | 261/104 |
| 4,938,787 | 7/1990 | Simmeriein-Erlbacher | 96/298 |
| 4,976,113 | 12/1990 | Gershuni et al. | 261/104 X |
| 5,024,686 | 6/1991 | Lerner | 96/361 |
| 5,057,368 | 10/1991 | Largman et al. | 428/397 |
| 5,110,325 | 5/1992 | Lerner | 95/213 |
| 5,310,416 | 5/1994 | Borger et al. | 95/64 |
| 5,318,731 | 6/1994 | Yokoya et al. | 261/104 |
| 5,472,613 | 12/1995 | Schofield | 210/634 |
| 5,704,966 | 1/1998 | Rohrbach et al. | 95/170 |
| 5,713,971 | 2/1998 | Rohrbach et al. | 261/104 X |
| 5,759,394 | 6/1998 | Rohrbach et al. | 210/264 |
| 5,891,221 | 4/1999 | Rohrbach et al. | 95/159 |
| 5,902,384 | 5/1999 | Rohrbach et al. | 96/296 |

FOREIGN PATENT DOCUMENTS

0600331 A1  6/1994  European Pat. Off. .

*Primary Examiner*—Richard L. Chiesa

[57] ABSTRACT

A filter device and technique are described which rely on absorption rather than adsorption for the removal of gas phase contaminants. A filter media is composed of wicking fibers which are impregnated with any of a variety of liquid phase absorbing systems made from the combination of a carrier liquid and soluble complexing/degrading agent or agents. The wicking fibers may be connected to an external reservoir which can be used to supply fresh absorbing fluid to the filter media giving them a potentially inexhaustible capacity. The filter media may be made from any of a variety of fibers which can rapidly transport a liquid phase by the nature of either their geometry or their chemical composition. Geometries may include multilobal cross-sectional configurations, porous hollow fibers, porous or striated fibers or tightly bundled microfibers, all of which exhibit the property of wicking fluid from an external source.

17 Claims, 3 Drawing Sheets

FILTRATION DEVICE AND METHOD USING ABSORPTION FOR THE REMOVAL OF GAS PHASE CONTAMINANTS

CROSS-REFERENCES TO RELATED APPLICATIONS

This application is a divisional of U.S. patent application Ser. No. 08/736,308 titled "A Filtration Device Using Absorption for the Removal of Gas Phase Contamination" filed Oct. 24, 1996, now U.S. Pat. No. 5,713,971, which is a continuation of now abandoned U.S. patent application Ser. No. 08/363,500 titled "A Filtration Device Using Absorption for the Removal of Gas Phase Contamination" filed Dec. 23, 1994 and assigned to the assignee of the present application.

The present invention relates generally to methods and apparatus for removing undesirable particles from air and more especially to such methods and apparatus for removing odors from air which is recirculated in an enclosed human environment such as an automobile, airplane or similar cabin.

BACKGROUND OF THE INVENTION

The oil and intake air filters commonly encountered in conjunction with internal combustion engines are exemplary of the filtering art and its associated problems. These filters utilize a somewhat porous paper filter element or similar filter media on which any undesirable particles are retained as fluid is passed through such filter element or media. As filtering continues, the filter element or media becomes more and more blocked by the removed particles which results in a further reduction of the flow rate even though the particle removing efficiency increases. These filtering systems essentially rely on adsorption which is a surface phenomenon wherein the removed particles adhere to the surface of the filter element or media. Another example of an adsorptive particle removal technique, is the use activated charcoal or a zeolite material as an odor removing element or media to purify an air stream. However, such techniques or method of purifying an air stream are effective only for a relative short time period, are relatively inefficient at low odor concentration levels, and frequently result in a relatively high pressure differential across the element or media. As a result very large quantity of media is the only satisfactory way in which to use these materials however the relative large pressure differential problem would remain.

A costly and complex solution to the flow rate and efficiency problems can be provided by employing absorption techniques wherein a counterflowing liquid and gas are intermingled in gas absorption tower with certain gas components being absorbed and removed by the liquid. Such "scrubbing" techniques are not suited to small solid filter applications since the interstices within the filter elements must be relatively large to avoid the liquid from clogging the filter elements and severely reducing air flow therethrough. These large openings significantly reduce the filtering efficiency.

An illustrative hybrid between the first two methods is shown in U.S. Pat. No. 4,323,373 which teaches an air cleaning system for a restaurant cooking grill wherein air is passed through filter elements which remove the undesirable materials and a scrubbing solution of water and detergent continuously circulates over the filter elements to remove congealed grease and other pollutants from those filter elements. Here, the filtering of particles from the air is an adsorption process, but the subsequent removal of the materials from the filter elements is an absorption process. This type system is relatively large and is adapted to high volume flow of relatively dirty air. While aptly suited to cooking grills, it is not well suited to more generalized odor removal functions. Also, as with the "scrubbers" mentioned above, the interstices within the filter elements must be relatively large to avoid the liquid from clogging the filter elements and severely reducing air flow therethrough.

It is desirable to provide a compact, economical absorptive air filter for the removal of odors which avoids the problems of reduced flow rates and reduced particle removing efficiency.

U.S. Pat. No. 5,057,368 entitled FILAMENTS HAVING TRILOBAL OR QUADRILOBAL CROSS-SECTIONS discloses a trilobal or quadrilobal fiber formed from thermoplastic polymers wherein the fiber has a cross-section comprised of a central core and three or four T-shaped lobes. The legs of each of the lobes intersect at the center of the core so that the angle between the legs of adjacent lobes is from about 80 to 130 degrees. The thermoplastic polymer is typically a nylon, a polyester, a polyolefin or a combination thereof. For example, a combination of a polyester such as polyethylene terephthalate and a polyolefin such as polypropylene may be used.

SUMMARY OF THE INVENTION

The present invention provides solutions to the above problems by providing a cabin air filtration system having structure forming a cavity with an air flow path therethrough. The cavity which has a liquid inlet and a liquid outlet, retains an internally wicking fibrous material through which fluid is transferred from the inlet to the outlet. An air-borne material absorbing liquid is supplied to the inlet and that air-borne material absorbing liquid and associated absorbed materials exits at the liquid outlet. Typically air is continuously circulated through the cavity from a cabin or room along a closed flow path consisting of the cavity and the cabin or room. Through experimentation it has been determined that extruded fibers such as disclosed in U.S. Pat. No. 5,057,368 are well suited to the practice of the present invention.

In accordance with another form the invention, the cavity includes a liquid reservoir which contains the air-borne material absorbing liquid. In this embodiment, the internally wicking fibrous material within the cavity draws liquid through capillary attraction from the reservoir into the air flow path without significantly restricting the air flow path.

In accordance with another aspect of the invention, undesirable materials are removed from an air stream by interposing a plurality of at least partially hollow wicking fibers in the air stream and supplying a liquid including a component having an affinity for the undesirable material to those wicking fibers at a location outside the air stream. The wicking fibers convey the liquid into contact with the air stream while maintaining relatively open interstices between the fibers so that the air stream flow is substantially unimpeded by the liquid. A concentration factor induced molecular migration effectively conveys the undesirable material in solution within the liquid away from the air stream.

BRIEF DESCRIPTION OF THE DRAWING

FIG. 1 is a view in cross-section of a cabin air filtration system wherein the filter cavity and associated liquid reservoir are common;

FIG. 2 is a view in cross-section of a cabin air filtration system wherein an air-borne material absorbing liquid is supplied to a filter cavity inlet and conveyed from a cavity outlet with cabin air circulated through the cavity;

FIG. 3 is a perspective view of an alternative filtration system cavity;

FIG. 4 is a view in cross-section of a modified cabin air filtration system wherein an absorbing liquid and associated absorbed materials are separated allowing the liquid to be returned for re-use; and FIG. 5 is a partial perspective view illustrative of a hollow wicking fiber suitable for use as an internally wicking fibrous material for use in the filtration systems illustrated in FIGS. 1, 2, 3, and 4.

Corresponding reference characters indicate corresponding parts throughout the several views of the drawing.

DETAILED DESCRIPTION OF THE INVENTION

The present invention is particularly suited to freshening the air of a relatively small space such as the cockpit of an aircraft, interior of an automobile, spacecraft, building, or similar enclosed environment all of which are hereinafter generically identified as a cabin. Freshening of the air is achieved by removing particles or gas from an air stream flowing through the cabin.

Figure 1:
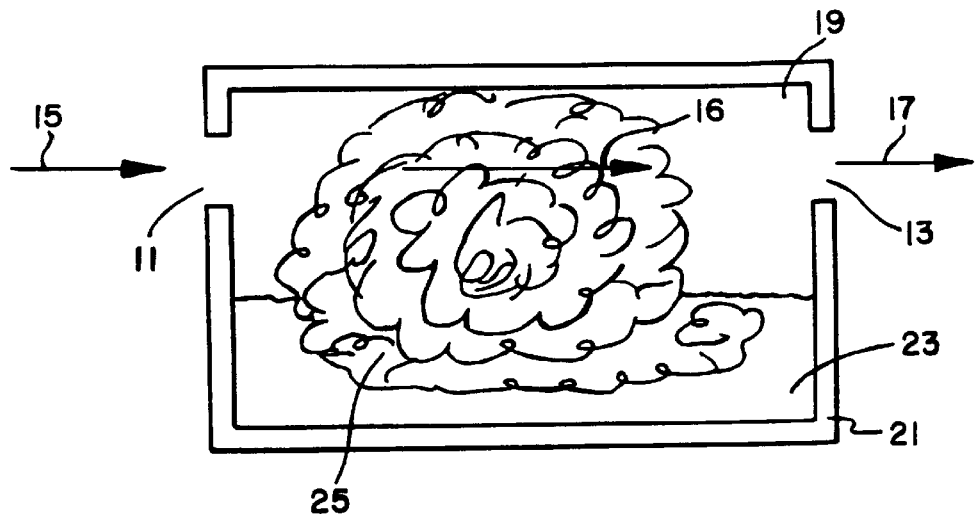

In FIG. 1, a cabin air filtration system according to the present invention has a housing 21 with a filter cavity 19 defined therein having an air inlet port 11 for receiving cabin air and an air outlet port 13 for returning that air to the cabin. Air flows from the cabin along laminar flow path 15, 16, and 17. Housing 21 includes a liquid reservoir 23 located in a lower liquid-tight portion of the cavity 19. The reservoir 23 contains an air-borne material absorbing liquid typically comprising an inert carrier with one or more chemically aggressive agents dissolved therein. The inert carrier preferably is a non-volatile liquid such as glycerol, polyethylene glycol, and polypropylene glycol although water may be used in some applications. Chemically aggressive agents which have an affinity for the undesired air-borne materials are typically selected. The undesirable materials may merely be taken into solution, or there may be a chemical reaction with the undesirable material. For example, sodium hydroxide effectively removes carbon dioxide by converting it to sodium carbonate. Sodium hydroxide is also effective to remove hydrogen sulfide or formaldehyde. Calcium chloride or common table salt may be used as a desiccant. Acetic or citric acids have been found suitable for some other odors. The possible carriers and aggressive agents are nearly unlimited.

Figure 5:
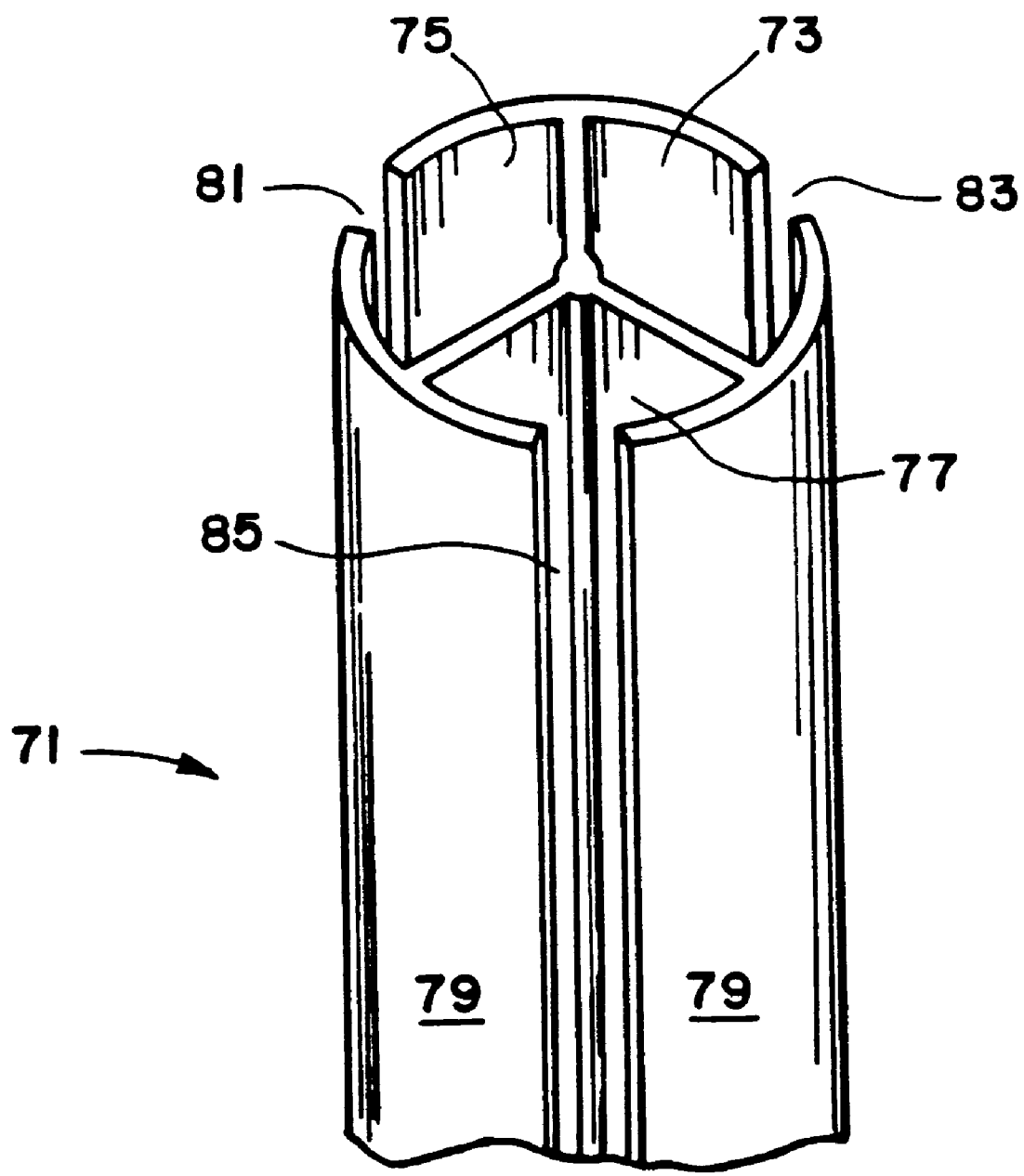

The cavity 19 also contains an internally wicking fibrous material 25 which functions by capillary action to move liquid upwardly from the reservoir into the air flow path without significantly restricting the air flow path. Many common materials which are effective wicking agents also restrict any attempt to circulate air through the material. For example, wetting a common handkerchief with water essentially seals the material against any air flow through it. By employing internally wicking materials where the capillary force inside individual fibers is far greater than that outside the fiber, the unrestricted air flow path about the outsides of the individual wicking fibers is maintained. Such an internally wicking fibrous material is sometimes formed of extruded strands having hollow interior regions which communicate with the outer strand surface. Strands of such a wicking fibrous material are illustrated in FIG. 5 as being C-shaped in cross-section or multi-lobed. A fan may be used to draw air from the cabin through the cavity 19 and back into the cabin.

Figure 2:
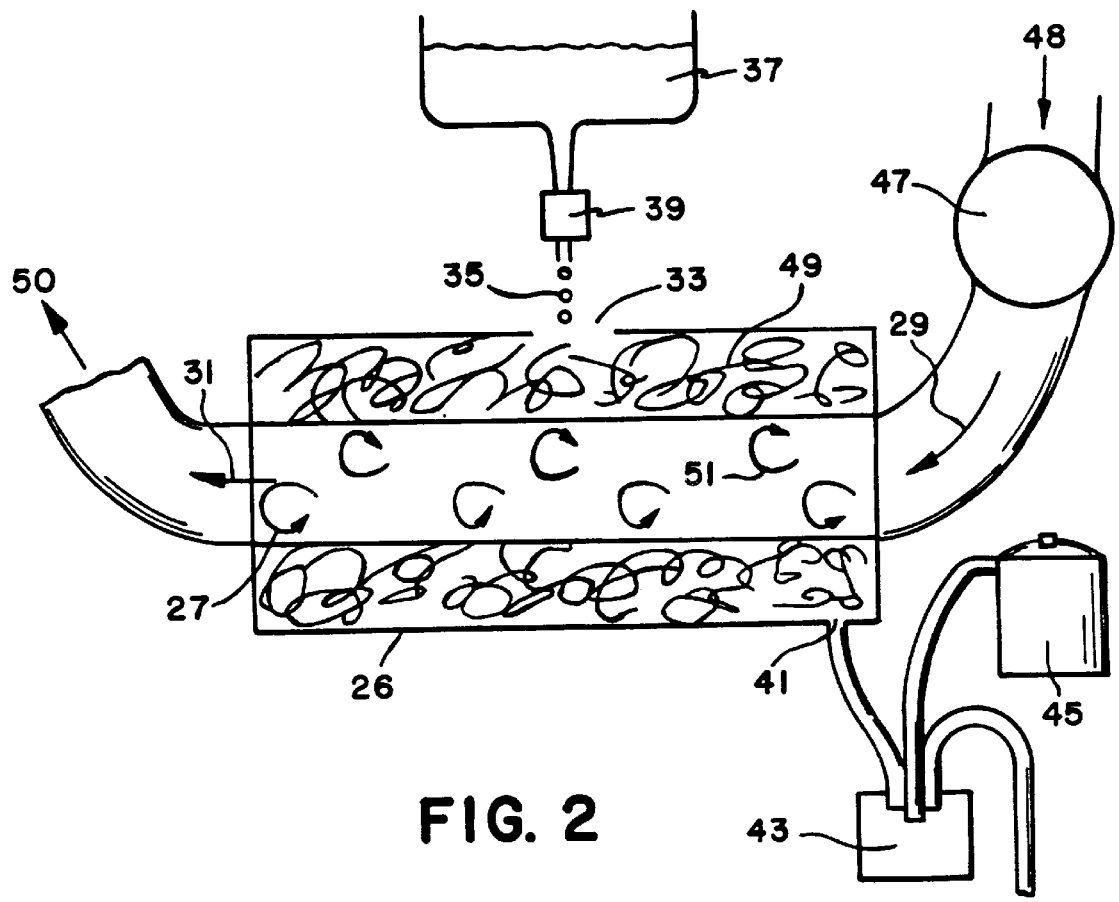

A system illustrated in FIG. 2 illustrates a closed loop cabin air filtration system to circulate air from the cabin, through the cavity 27 of a cylindrical housing 26 preferably along a laminar air flow path along arrows 29 and 31 from an inlet 48 and back into the cabin through an outlet 50. A liquid inlet port 33 receives an air-borne material absorbing liquid 35 from an external reservoir 37 as determined by flow control valve 39. The control of valve 39 may be timed to periodically release liquid, may be enabled only when an ignition switch is on, or otherwise controlled to limit liquid flow. Housing 26 has a liquid outlet port 41 for removing the air-borne material absorbing liquid and associated absorbed materials from the cavity 27 to, for example, a vehicle radiator 45 overflow tank 43. The internally wicking fibrous material 49 is generally annually disposed within the cavity 27 and transfers fluid from the inlet port 33 to a sump adjacent outlet port 41. Because the air flow path through the cavity is relatively long and narrow, turbulence may occur as illustrated by arrows 51 which can provide a mixing and may result in good exposure of the incoming air to the air-borne material absorbing liquid. An illustrative, fan 47 provides for circulation by drawing air through inlet 48 from a cabin, pushing this volume of air through the cavity 27 along the air flow path 29, 31 and back into the cabin through outlet 50.

Figure 3:
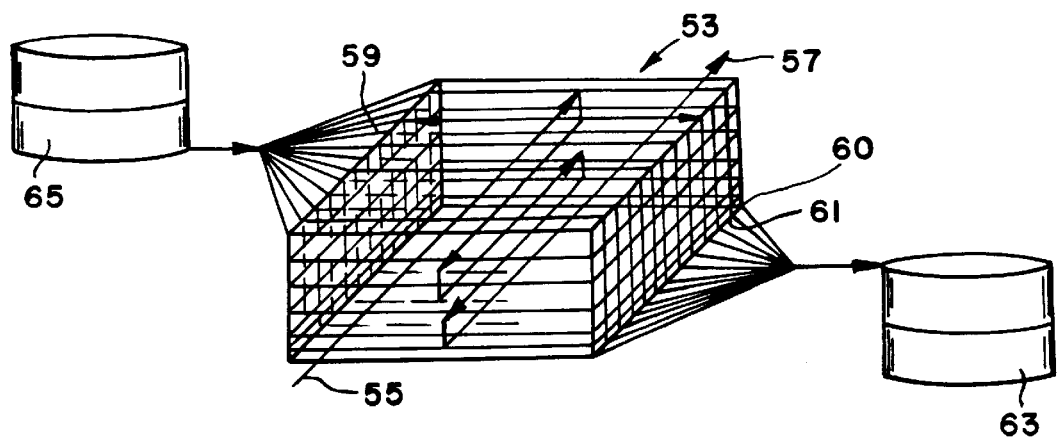

In FIG. 3, the housing for the cavity of the air filtration system is not shown, but such housing would surround the parallelepiped-shaped mass of wicking material 53. In this illustration, the fibrous wicking material has a plurality of generally parallel elongated fibers oriented to extend generally from left to right as viewed and in the intended direction of the flow path for fluid transfer. The air flow path for air is shown by arrows 55 and 57 and lies generally perpendicular to flow path for the liquid. A liquid inlet is provided near an upper edge 59 and a liquid outlet is provided near a sump 60 on a lower edge 61. The sump 60 communicates the cavity to a reservoir 63 for holding the air-borne material absorbing liquid.

One of the reservoirs may be eliminated from FIG. 3 to more nearly mimic the closed loop system described in conjunction with FIG. 1. In such a closed loop system the undesirable materials absorbed in the mass 53 will be effectively conveyed to the used solvent reservoir 63 by migration due to a concentration factor difference. However, periodic replacement of the fluid would then be necessary.

Figure 4:
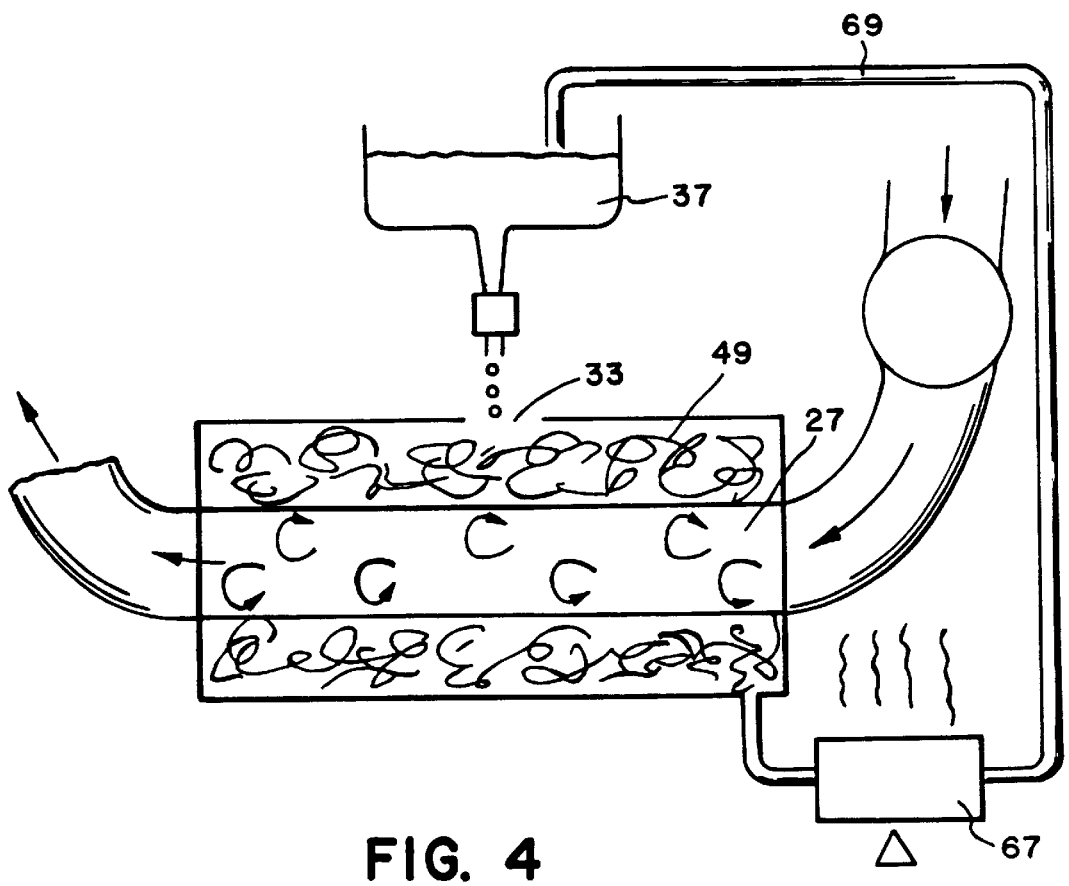

The system in FIG. 4, which is modification of the system of FIG. 2, illustrates structure which eliminates the need for periodic replacement of the fluid in reservoir 37. In this system, the air-borne absorbing liquid is regenerated by heating to drive off the noxious materials which were absorbed in the filter chamber 27. Here, the air-borne material absorbing liquid and associated absorbed materials are received in vessel 67 and heated or otherwise treated to separate the absorbed materials from the liquid. As the noxious materials are removed, the liquid may be returned by conduit 69 to the supply reservoir 37 and ultimately is provided to the liquid inlet port 33 for re-use in cavity 27 by the wicking fibrous material 49.

As in FIG. 3, the reservoir 37 of FIG. 4 could be eliminated and filter cavity or chamber 27 would function as a material pick-up zone while vessel 67 constitutes a restoration zone with a non-mechanical migration of undesirable particles from one zone to the other.

The wicking fibrous material 71, as illustrated in FIG. 5, is formed as an extruded strand having three hollow interior regions 73, 75 and 77 each of which communicates with the outer strand surface 79,79' by way of generally parallel slots 81, 83 and 85. The capillary forces within the individual inner grooves 73, 75, and 77 are so much greater than those external to the fiber that liquid is readily wicked up the interior of the fiber without appreciable wetting of the external surface 79,79'. Thus, a mesh of such fibers 71 would remain unclogged even in the presence of a liquid and as a result this function is generally referred to as internally wicking. Such a fibrous material may be made of one or more materials such as nylons, polyesters, and polyolefins. The three T-shaped cross-section segments may have the outer portion of the T curved as shown, or straight. While the wicking fibrous material is depicted as three-lobed, any other numbers of lobes are possible. In addition, a C-shaped or other cross-sectional configurations may also be suitable for an internally wicking fiber for various applications.

The method of operation of the invention should now be clear. Undesirable material is removed from an air stream by interposing a plurality of at least partially hollow wicking fibers in the air stream and a liquid including a component having an affinity for the undesirable material is communicated through the wicking fibers as the air stream from an external location flows along an air path. In this way, the wicking fibers can convey material absorbing liquid into contact with the air stream while maintaining relatively open interstices between the fibers so that the air stream flow is substantially unimpeded by the liquid. The undesirable material in solution within the liquid may then be conveyed the from the air stream by a concentration factor induced molecular migration, by gravity, or may be removed and the liquid recirculated for repeated use.

What is claimed is:

1. A method of removing undesirable gas phase material from an air stream comprising the steps of interposing a plurality of at least partially hollow wicking fibers in the air stream, with each wicking fiber having a least one slot extending along the wicking fiber and connecting the wicking fiber hollow internal region to an outer surface, and supplying a liquid including a component having an affinity for the undesirable gas phase material to the wicking fibers at a location outside the air stream whereby the wicking fibers can convey the liquid by capillary action into contact with the air stream along the slots while maintaining relatively open interstices between the fibers so that the air stream flow is substantially unimpeded by the liquid.

2. The method of claim 1 including the additional step of conveying the undersirable gas phase material in solution within the liquid from the air stream.

3. The method of claim 2 wherein the step of conveying comprises concentration factor induced molecular migration.

4. Apparatus for removing gas phase molecules from a fluid stream comprising:

a plurality of elongated fibers each having a longitudinally extending hollow internal cavity including an opening extending longitudinally along said fiber from the internal cavity to the outer fiber surface;

a liquid which can absorb the gas phase molecules disposed within the internal cavities of said plurality of elongated fibers;

a flow path for the fluid stream, containing the gas phase molecules to be removed, directed over a portion of said plurality of elongated fibers whereby the gas phase molecules to be removed are absorbed by said liquid; and means for directing said fluid stream along said flow path.

5. Apparatus as claimed in claim 4 wherein the longitudinally extending internal cavity in each of said plurality of elongated fibers is sized so that said liquid is retained within the cavity by capillary forces.

6. Apparatus as claimed in claim 4 wherein the gas phase molecules to be removed which are absorbed by said liquid are moved within said liquid by a concentration factor-induced molecular migration.

7. Apparatus as claimed in claim 4 wherein the fluid stream is air.

8. Apparatus as claimed in claim 4 wherein a plurality of internal cavities, each including an opening to the outer fiber surface, are formed in each fiber.

9. A filter for removing selected types of gas phase molecules from a fluid stream comprising:

a plurality of elongated fibers, each having an elongated open channel extending into the interior of the fiber, disposed to form a fiber filter mat; and a liquid which has an affinity for the selected types of gas phase molecules disposed and retained within the channels and having an exposed portion, near the exterior of the fiber, for communicating with the fluid stream along the open channel and absorbing the selected types of gas phase molecules as the the fluid stream passes through the filter.

10. A filter as claimed in claim 9 wherein each fiber includes a plurality of elongated open channels within which the liquid which can absorb the selected types of gas phase molecules is disposed.

11. A filter as claimed in claim 9 wherein the fibers are disposed in generally a parallel alignment in the fiber filter mat.

12. A filter as claimed in claim 9 wherein the fibers are disposed randomly in the fiber filter mat.

13. An air filtration system for removing gas phase contaminants comprising:

a plurality of fibers each having at least one longitudinally extending open channel projecting into the interior of the fiber, a liquid which can absorb the gas phase contaminants disposed within the open channels in said plurality of fibers, and an air flow path containing the gas phase contaminants directed over a portion of said plurality of fibers whereby the exposed portion of said liquid disposed in the open channels is in liquid communication with the air flow path and absorbs the gas phase contaminants.

14. An air filtration system for removing gas phase contaminants as claimed in claim 13 comprising gas phase contaminant removal means for removing the absorbed gas phase contaminants from said liquid at a location which is outside of said air flow path.

15. A filtration device for removing vapor molecules which cause odors from an air stream comprising:

a housing;

an air flow path through said housing for the air stream;

a fibrous wicking material having a plurality of strands which are disposed in said housing to intercept the air flow path;

said plurality of strands each having a hollow internal region connected to an outer surface through at least one longitudinally extending opening;

a selected vapor absorbing liquid disposed in the hollow internal regions of said plurality of strands and communicating through said longitudinally extending openings in said plurality of strands with the air stream following the air flow path through said housing; and, means for directing said air stream into contact with said selected vapor absorbing liquid along said longitudinally extending openings whereby said selected vapor absorbing liquid absorbs odor causing vapors molecules through said longitudinally extending openings.

16. A method for continuously removing specific types of gas molecules from a gas stream comprising the steps of:
   a. selecting a liquid which has an affinity for the specific types of gas molecules to be removed;
   b. placing the selected liquid on a mat formed from a plurality of wicking fibers which have the ability to move the selected liquid along their surface yet retain the selected liquid within longitudinally extending channels having longitudinally extending openings against moving into the space between the individual wicking fibers;
   c. directing the gas stream through a portion of the mat into contact with the selected liquid along the longitudinally extending openings whereby the selected liquid absorbs the specific types of gas molecules.

17. A method for continuously removing specific types of gas molecules from a gas stream as claimed in claim 16 comprising the additional step of:
   d. directing a second gas stream through a different portion of the mat so that the specific type of gas molecules, which have been absorbed by and disbursed through out the selected liquid, are stripped and carried away.

* * * * *